10

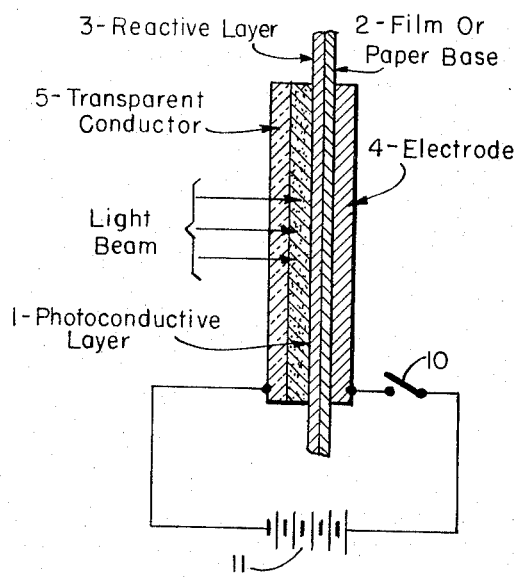
FIG. 1.
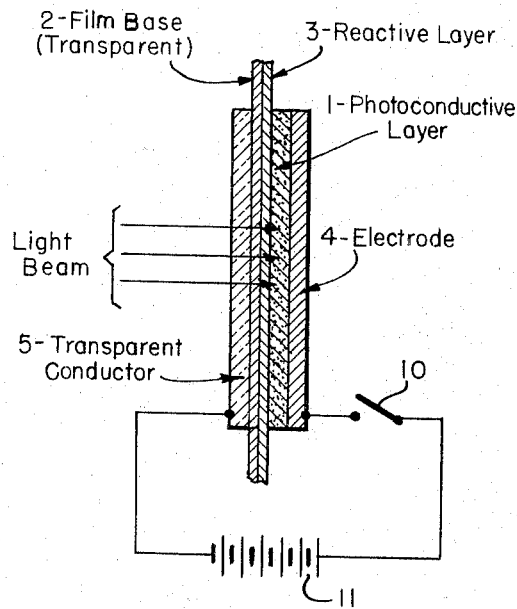
FIG. 2.
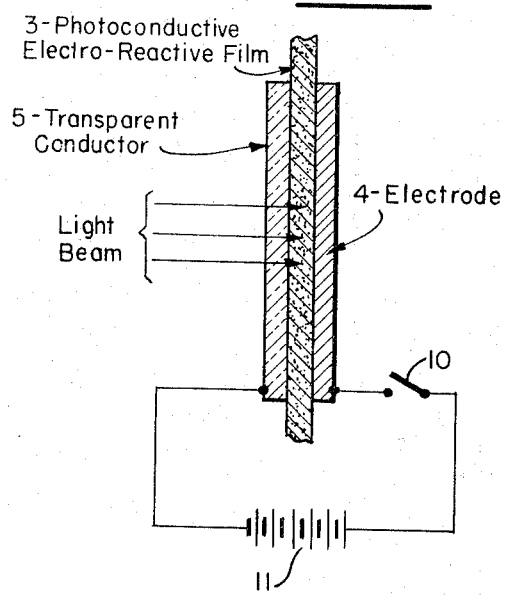
FIG. 3.
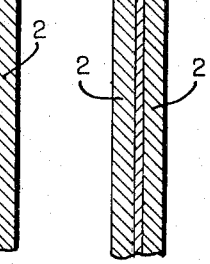
FIG. 4A.  FIG. 4B.  FIG. 4C.
INVENTOR
Roland M. Schaffert

United States Patent Office 3,316,088
Patented Apr. 25, 1967

3,316,088
PROCESS OF ELECTROPHOTOGRAPHY BASED ON ELECTROPHOTOLYTIC REACTIONS AND ELEMENT THEREFOR
Roland M. Schaffert, Saratoga, Calif., assignor to International Business Machines Corporation, New York, N.Y., a corporation of New York
Filed Feb. 11, 1963, Ser. No. 257,671
11 Claims. (Cl. 96—1.5)

This invention relates to a novel one-step process of electrophotography based on electrophotolytic reactions which occur when an electric field is impressed upon an assembly subjected to imagewise actinic radiant energy illumination, the assembly comprising in combination a photoconductive material and a reactive material, the photoconductive material serving to produce imagewise increase of field intensity in the reactive material such that the reactive material is selectively decomposed to form an image corresponding to the light pattern impinging upon the assembly. The assembly may consist of separate layers of photoconductive material and reactive material or the two materials may be combined into one layer. The invention also relates to new products useful in the new process.

The effect of increasing the intensity of the electric field in the reactive material is to be contrasted with the decomposition which occurs due to the action of light alone, e.g., in the absence of an electric field. It has been discovered that the decomposition in reactive material resulting from the simultaneous application of electric field and radiant illumination can occur at lower levels of illumination than in the case where the electric field is not impressed upon the reactive substance, e.g., where decomposition is based only upon intense flashes of light.

Light sensitive compounds other than silver halides are well-known but only some of these are suitable as the reactive compounds of the present invention. Generally, the compounds which are suitable as the reactive material of the present invention fall into four classes:

(1) Non-silver halide heavy metal compounds such as salts of organic and inorganic acids and heavy metal acetylene derivatives which exemplify reactive materials which darken under the electric field and light exposure conditions of the invention;

(2) Organic diazonium and azide compounds, such as benzene diazonium nitrate and benzene diazonium perchlorate, which illustrate decomposable reactive materials which liberate gas, e.g., nitrogen, from the organic part of the molecule;

(3) Organic amine salts of hydrazoic acid and perchloric acid, such as p-diazodiphenyl amino perchlorate, triphenyl methyl azide and tri-p-anisyl methyl perchlorate, which illustrate materials which decompose to liberate gas from the inorganic part of the molecule and which produce a color change in the organic product of decomposition; and (4) Water-soluble ionic azides, acetylides, iodates, nitrates and perchlorates, such as potassium azide, sodium azide, lithium azide, sodium iodate, lithium iodate, magnesium perchlorate, cadmium perchlorate, sodium nitrate, and the like, which illustrate materials not appreciably affected by light but which decompose when subjected to an electric field.

Two basic principles are involved:

(a) The combined action of an electric field and electromagnetic radiation to produce a chemical reaction, specifically decomposition.

(b) The action of an electric field alone to produce the decomposition.

The principle of the invention can be readily understood in the case of silver azide. This compound can be decomposed by photochemical reactions when exposed to a sufficiently intense light source. Also silver azide can be decomposed when subjected to a sufficiently high electric field. It has been determined that when an electric field less than that necessary to cause decomposition is applied to this material, exposure to light of rather low intensity will initiate decomposition. Thus with the aid of a photoconductive layer in contact with a reactive layer of silver azide it is possible to cause selective decomposition in the reactive layer by photoconductively producing localized increases in the electric field. A more sensitive electrophotographic effect is obtained if the light, impinging upon the photoconductive layer, also penetrates the reactive layer. In this case the combined effect of photo-decomposition and electro-decomposition are utilized.

As a result of the illumination by light and application of an electrical field, the reactive material is decomposed. In this case the solid azide breaks down into gaseous nitrogen and a darkened metal residue. Depending upon the color of the metal residue, an image is produced, more or less dark. Also a reticulated or bubbly appearance can be produced in the electro-reactive layer due to the liberation of gas when the azide is incorporated in a suitable resin binder.

Thus in the embodiment of the method employing silver azide a darkened metal image is produced. The unreacted material remains substantially transparent. A negative or positive transparency is thereby produced.

Examples of preferred reactive compounds are heavy metal salts of organic and inorganic acids and heavy metal organic compounds, such as lead azide, silver azide, copper azide, mercury azide, thallium azide, silver acetylide, silver oxalate, lead oxalate, gallium oxalate, cadmium oxalate, mercuric acetylide, silver fulminate, lead fulminate, silver perchlorate, lead perchlorate and zinc amide. These preferred heavy metal compounds are in the classes of azides, fulminates, oxalates, acetylides and perchlorates, and are all capable of being decomposed by the action of light alone, particularly intense flashes of ultraviolet light. These preferred heavy metal compounds decompose at a lower level of illumination when subjected simultaneously to action of an electric field.

Under the influence of an electric field and the projection of an imagewise actinic light pattern, decomposition of reactive heavy metal compound occurs much more efficiently than by the action of light alone and results in a visible image in the reactive layer containing the heavy metal compound. The assembly is stable under normal lighting conditions, yet the normally light-insensitive reactive material therein decomposes selectively when subjected to the electric field and actinic illumination to produce a visible image. The single step of exposure under actinic light and electric field produces instantaneous dry development in the reactive layer similar to that which is physically observed with silver halide dry print-out films. However, the process of the invention eliminates the usual necessary steps of fixing, washing and drying which are needed with conventional print-out materials.

Effectively, the new process of the invention provides a new, single step direct copying system which is based upon the simultaneous impression of an electric field and actinic, imagewise illumination on a reactive assembly to produce a visible result, such as by darkening, bleaching or liberation of gas and to produce a stable image.

Quick processing has long been regarded as an important objective of the photographic process, whether of the conventional silver halide type or of the xerographic type, or of new non-silver processes, such as the Kalvar process, and efforts to attain this objective have been intensified in recent times.

The xerographic process is based on physical rather than on chemical phenomena employing a photoconductor which is sensitized to light by depositing an electrical charge uniformly on its surface in darkness, thereafter exposing to a light pattern by contact or projection which reduces the original charge at any point in proportion to the light intensity, thereby forming a latent electrostatic image. Development by various methods of dusting yields a visible image. The electrostatic image with charged powder particles is used for projection either directly from the plate surface or transferred to paper as a hard copy. The essential steps are charging, exposing, developing and transfer to achieve the hard copy. The transfer is usually accompanied by a fusing step to permanently fix the powder image to the paper.

The present invention distinguishes from the conventional xerographic process in all of the four essential steps above and is most closely analogous to the Kalvar process, such as is disclosed in U.S. Patent No. 2,996,381, granted Aug. 15, 1961; but it is completely distinguished as a physical photo-reproduction process because it relies upon the influence of an impressed electric field to localize decomposition in a reactive layer which is held in contact with a photoconductive layer. Some of the same photoconductors which are usable in xerography may be used as the photoconductive layers in accordance with the invention.

The basic distinction between the process of the invention and xerography is that the present process does not involve formation of a latent electrostatic image while this is essential in xerography.

Photoconductive materials which may be employed are anthracene and polyvinyl carbazole which are examples of transparent materials, and amorphous selenium, cadmium selenide, cadmium sulfide and zince oxide, examples of opaque materials.

The photoconductor function in accordance with the present invention is to provide localized increased electric field intensity by conduction to the reactive layer for localized decomposition of the active material therein, the decomposition occurring under lower intensity of illumination than is necessary for photolytic decomposition of the same material.

Thus in contrast to the Kalvar process, the method of the present invention does not include a heat-fixing step and the method of the present invention may rely mainly upon the decomposition due to the light enhanced electrical charge conduction through the photoconductor to the electro-reactive compound or it may proceed mainly by photolytic decomposition enhanced by the electrical field due to the lowering of the threshold intensity of illumination which results from the impression of the electrical field. Both mechanisms are available and either or both may be used in accordance with the detailed description of the invention which follows. Whereas the Kalvar process is limited to photolytic compounds, the process of the present invention may utilize non-photolytic compounds which break down solely under the influence of electrical field which is brought above the threshold intensity for decomposition by light induced photoconduction.

Accordingly, an object of the invention is to produce a photographic image containing decomposition products of reactive compounds without requiring any developing or fixing steps and thereby constituting a dry photographic process.

A further object of the invention is to provide novel photographic elements for producing an image through the single step of exposure in the presence of an electrical field, said element comprising a photoconductor providing an electrical image which is conducted to the reactive layer causing decomposition of reactive material in said layer to produce a visible change.

The foregoing and other objects, features and advantages of the invention will be apparent from the following more particular description of preferred embodiments of the invention, as illustrated in the accompanying drawings.

FIGURE 1 illustrates in sectional and schematic view a reactive element on a film or paper base sandwiched between a photoconductive layer on a transparent conductive backing and an electrode in accordance with the invention;

FIGURE 2 illustrates in section a schematic view of a photoconductive element on an opaque metal base wherein the reactive layer and the film base are both transparent;

FIGURE 3 is a sectional view of a photoconductive, electro-reactive element wherein the active material is both photo-reactive and electro-reactive and is embedded in a resinous film-forming binder;

FIGURE 4a shows in section and schematically a modification of the electro-reactive layer usable in the embodiment of FIGURES 1, 2, and 3, wherein the electro-reactive compound is dispersed in the form of finely divided particles or as a solid solution in the transparent synthetic resinous colloid film layer constituting the reactive layer;

FIGURE 4b shows in section and schematically a modification of the reactive layer usable in the embodiment of FIGURES 1 and 2, wherein the reactive compound is coated on one side of a transparent synthetic resinous film layer constituting the reactive layer; and FIGURE 4c shows in section and schematically a modification of the reactive layer usable in the embodiments of FIGURES 1 and 2, wherein the reactive compound is sandwiched in the form of a layer between two transparent synthetic resinous film layers and constitutes the reactive layer.

Referring more particularly to FIGURE 1 of the drawings, a preferred photo-reproduction embodiment of the invention may comprise a photoconductive layer 1 made of anthracene, on transparent conductive layer 5, which is separated from a conductive backing or base 2 by the reactive layer 3. Reactive layer 3 sandwiched between the base 2 and the transparent photoconductive layer 1 comprises a reactive material dispersed in a suitable transparent resin coated on transparent film base or on paper, these serving as the support for this active material.

A suitable resin support may be cellulose acetate, synthetic linear polyamides such as nylon and polyethylene terephthalate (Mylar), vinyl vinylidene chloride copolymer, a copolymer of vinyl chloride and vinyl acetate, a copolymer of vinylidene chloride and acrylonitrile, polymethyl methoacrylate, polyethylene polypropylene, ester gum, vinyl acetagemaleic anhydride resin, cellulose acetate butyrate, and ethyl cellulose. Each of these resinous supports is transparent. Glass may also be used.

The support need not be transparent and colored or white paper may then be used, or the support may be a metal backing.

In the embodiment shown in FIGURE 2 the photoconductor is on an opaque metal base but the reactive layer and film base in this case must both be transparent.

Illustrating the general method as carried out with the structure of FIGURE 1, an electric field is impressed on the assembly shown through the electrodes 4 and 5 from the electrical voltage source 11 by pressing switch 10 and the assembly is subjected to imagewise illumination by light from a source (not shown). Wherever light strikes the transparent photoconductive layer 1, the area of the reactive layer 3 immediately adjacent the light illuminated area will be subjected to an increased electric field. This increase in the electric field brings the active material to a point of decomposition.

In the general method which is illustrated under the structure of FIGURE 1, the reactive material which is selected may be a heavy metal compound, an organic diazonium compound, an organic amine salt or a water-soluble ionic compound.

It is noted that the photoconductive layer, as used in FIGURES 1 and 2, is not an integral part of the image-bearing film structure. It is a separate layer on a separate base and is re-usable. It comes into contact with the reactive layer only during the image-forming process. The photoconductor need not be a good insulator in the dark as in xerography. Thus a wider selection of photoconductive materials is possible. The image-bearing film structures are as shown in FIGURES 4a, 4b and 4c. No photoconductive layer, as such, is joined to these structures, although some of the photoelectro-reactive materials are also photoconductive; e.g., silver azide, thallium azide, and tri-p-anisyl methyl perchlorate.

Three types of film structure are shown in FIGURES 4a, 4b and 4c. In FIGURE 4a the reactive film is dispersed within a resin film, whereas in FIGURE 4b the reactive material is coated on one side of a film base, and in FIGURE 4c a layer of the material is sandwiched between two film layers.

When the reactive material is a heavy metal compound such as lead oxalate and is dispersed as reactive material 13 in a synthetic hydrophilic resin colloid binder 12 of FIGURE 4a, the metal compound darkens on decomposition and a negative or positive transparency is the final product. The darkening effect which produces the visible image may be intensified by suitable oxidation treatment such as with hydrogen peroxide.

In a further example, a gas liberating reactive material is employed with a synthetic resin binder material and coated onto the resinous layer 2 of FIGURES 4b and 4c and the gas liberated by decomposition of the reactive compound in the reactive layer can produce an image in each of the process embodiments shown in FIGURES 1, 2 and 3. This image is the result of a light scattering micro-bubble record, the bubble record being made by the intensification of electrical field in the light-struck areas by means of the photoconductor 5 of the method shown in FIGURES 1 and 2.

The version of the process where image formation is due to gas bubbles is limited to material structures where a transparent emulsion is coated on a transparent film base when the product is to be a positive or negative transparency or on an opaque (preferably black) paper base when the product is to be a print. Since bubble formation by dissociated gas can take place only when the reactive material is dispersed in a binder and since the contrast level requires careful control of the proportions of reactive material, as well as subsequent treatment steps such as by heating, this embodiment representing the formation of vesicular images is a more difficult one than other embodiments of the invention and is therefore a less preferable embodiment.

A particularly preferred embodiment of the invention for producing photo-transparencies (negatives or positives) is that shown in FIGURE 2 which utilizes amorphous selenium as the photoconductive layer 1 and the transparent photoelectroreactive layer 3 consists of an emulsion of silver azide in a polystyrene binder which is coated on a transparent conductive base 5 of polyvinyl carbazole. The emulsion side must face the selenium photoconductive layer.

Another preferred embodiment for producing prints or photocopies is as shown in FIGURE 1 where transparent anthracene is used as the photoconductive layer and a photoelectro-reactive emulsion (not necessarily transparent) is coated on a conductive paper base.

The drawings herein illustrate three principal mechanisms by which selective imagewise decomposition can be produced in the reactive layer:

(a) The use of a photoconductive layer to produce selective imagewise increase of the electric field across a layer of electro-reactive material, as shown in FIGURES 1 and 2.

(b) The application of an over-all uniform electric field to a photoelectro-reactive material to enhance the photolytic reaction. Selective imagewise decomposition in this case is provided only by the variations in illumination of the light image; as shown only in FIGURE 3.

(c) The use of a photoconductive layer together with a photoelectro-reactive layer to provide selective imagewise enhancement of both electric field and the photolytic reaction; i.e., the light from the image during exposure increases the electric field across the reactive layer and also penetrates this layer to produce a photolytic reaction. This mechanism is shown in FIGURE 1 when the photoconductor is transparent, and in FIGURE 2 when the photoelectro-reactive layer is transparent.

In FIGURE 1 the photoconductor need not be transparent if a non-photolytic electro-reactive material is used, but if photoelectro-reactive material is used, the photoconductor must be transparent. In FIGURE 2 the photoconductor need not be transparent in either case, but the reactive layer must be transparent.

The following explanation will serve to define the term "transparency" as it is used here in respect to radiation in the visible range and outside of the visible range. Although transparency is usually considered as something that can be seen through, it is relative and depends upon absorption characteristics of materials at different wavelengths; e.g., a material may be transparent in the visible region and opaque in the ultraviolet or infrared region, or vice versa, or it may be transparent in certain portions of the visible spectrum and opaque in other regions of the visible.

For the purposes of this invention it is important that the transparency be in the proper region of the spectrum. For example, in the preferred embodiment of the invention, mentioned above as shown in FIGURE 2, amorphous selenium (essentially opaque even in extremely thin films) has a peak sensitivity of 4000 A., and the photoelectro-reactive layer must therefore transmit light at or near this peak. For this reason, silver azide, having a transmission cut-off at 3600 A. and good transparency at wavelengths longer than 3800 A., would be satisfactory as the photoelectric-reactive material. Conversely, for the second preferred embodiment mentioned above as shown in FIGURE 1, anthracene has a peak sensitivity in the near ultraviolet region and transmits in the visible region. Therefore, anthracene is suitable for use with tri-p-anisyl methyl perchlorate whose peak sensitivity for photolytic reaction is about at the middle of the visible region.

The preparation of novel specific embodiments of the electrophotographic copying element is given in the following examples by way of illustration; and these examples show the production of elements useful for manufacture of copying structures uniquely designed for one-step operation, e.g., simultaneous exposure and development through a mechanism of decomposition of reactive material adjacent a photoconductive layer employing normally stable materials and eliminating the usual fixing and other subsequent or post exposure steps required in other systems, thereby providing an extremely useful process for microimaging, microfilming, photostorage and rapid processing.

EXAMPLE

This example illustrates the preparation of several types of reactive materials, the first type (a) illustrating an electro-reactive material and the second type (b) illustrating a light sensitive electro-reactive material which is hereinafter termed a "photoelectro-reactive" material. A third type (c) is also termed a "photoelectro-reactive" material. It is electro-reactive, but has the additional property of photoconductivity.

The preferred ecompounds under (a), which are hereinafter termed as "electro-reactive" to distinguish them from the photoelectro-reactive type (b), are exemplified as follows:

Potassium azide
Cadmium oxalate
Gallium oxalate
Lead oxalate
Lithium iodate
Silver iodate
Magnesium perchlorate
Sodium nitrate
Sodium acetylide
Zinc amide The preferred compounds under type (b) fall into two classes and illustrative examples of these are ilsted under the headings "metal type" and "organic type."

*Metal type*
-silver azide
-silver acetylide
-silver oxalate
-mercuric acetylide
-mercuric azide
-silver fulminate

*Organic type*
-benzene diazonium nitrate
-benzene diazonium perchlorate
-p-diazodiphenyl amino perchlorate
-triphenyl methyl azide
-tri-p-anisyl methyl perchlorate
-2-amino-1-naphthol-5-sulfonic acid
-4-diethyl-aminobenzene diazonium chloride
-4-diethylaminobenzene diazonium chloride, zinc chloride double salt
-para-diazo dimethyl aniline zinc chloride
-p-(hydroxyethylethyl amino) benzene diazonium chloride
-diphenyl amine diazonium sulfate The preferred compounds under type (c) are of two kinds: single materials and mixtures. Examples of single materials exhibiting both photoconductive and electro-reactivity are: silver azide, thallous azide, lead azide, and tri-p-anisyl methyl perchlorate. Mixtures are: polyvinyl carbazole-potassium azide, anthracene-sodium nitrate, and zinc oxide-silver iodate.

Silver azide has a photoconductive peak at 3,800 Angstroms. This compound has good transparency at wavelengths longer than 3,800 Angstroms. It also has a transmission cut-off at 3,600 Angstroms. These wavelengths are such that silver azide is transparent in the visible range and sensitive to light in the near ultraviolet range.

In the case of thallium azide, the photoconductive peak, e.g., maximum sensitivity, is similar, e.g., it is transparent at wavelengths longer than 3,500 Angstroms and sensitive to near ultraviolet.

Tri-p-anisyl methyl perchlorate has a photoconductivity peak at 5,900 Angstroms, and would, therefore, be sensitive in the middle of the visible part of the spectrum.

Many of the "metal type" materials, listed under type (b) above, have been found to be electro-reactive as well as photoelectro-reactive, i.e., they are decomposable under the influence of an electric field alone, but are more rapidly decomposed under the combined influence of light and an electric field. Specific examples are silver azide, cuprous azide, and silver acetylide.

All of the organic materials under (b) are photolytic diazonium or diazo compounds effective in concentrations varying from 0.1 to about 10% by weight of the resin binder vehicle in which they are incorporated to produce an image upon exposure to radiation within the range of 300–420 millimicrons, e.g., in the ultraviolet range. The light source used for one-step exposing and developing in accordance with the invention may be a mercury lamp. xenon-filled discharge lamp, zirconium arc or carbon arc. Suitable filters may be used to select radiation of predetermined wavelengths.

The processing technique employed for making the electro-reactive layer is conventional and usable with any of the resin vehicles or binders mentioned herein, which are also conventional. The films are formed by solvent formulation and casting techniques which are widely used in the art. The specific illustration below, using potassium azide as the electro-reactive material under (a) above, provides a photographic element which produces a negative image when exposed to a positive optical image.

An ethanol solution was prepared containing 15% of soluble polyamide resin, known as Zytel 61 (trademark of E. I. du Pont de Nemours & Co.), and 5 parts of potassium azide was added to 100 parts of this ethanol solution. The potassium azide dissolved in the solution and the solution was poured onto the conductive side of a Nesa glass plate with a transparent conductive coating of stannous oxide to provide a continuous coating about 0.5 to 1.0 mil thick and this film was thereafter dried. The prepared film on glass was assembled as shown in FIGURE 1, by placing the electro-reactive layer in contact with a photoconductive layer 1, consisting of polyvinyl carbazole, approximately 1 mil thick deposited on a Nesa glass plate, designated as transparent conductor 5, which also serves as an electrode, together with the electrode 4, for impressing an electric field upon the assembly. The schematic showing of FIGURE 1 embraces the film dispersion and solution in the embodiments of FIGURES 4b and 4c. The voltage impressed from source 11 is selected at 600–700 volts and simultaneously an image is projected by the light beam as shown in the arrangement of FIGURE 1. The light exposed areas of photoconductive layer produce an increased intensity of electric field through the electroreactive layer resulting in a darkened image due to decomposition of the azide. The light used for exposure is high intensity light from a 500 watt mercury lamp at a distance of one foot for about 5 seconds during which time the voltage was applied.

The effective amount of the electro-reactive material of type (a) may vary between 1 and 20% by weight of the binder.

Instead of casting the nylon solution onto a glass plate as above, the solution may be cast onto cellulose acetate film base to provide the assembly of FIGURE 4b. The nylon film may also be laminated between two sheets of cellulose acetate to form the embodiment of FIGURE 4c. The nylon film may be laminated to a white or colored paper base to form the embodiment shown in FIGURE 1. Also, instead of laminating the nylon film to paper, it may be more convenient to impregnate the paper base with the electro-active material.

The following example illustrates a preferred method for making the novel photographic copying element of the invention utilizing the photoelectro-reactive material under type (b). The material selected is silver azide which is added in an amount of 3 parts in 100 parts of 15% nylon coating solution as used above. A film is cast on Nesa glass in a thickness of about 0.5 mil and then dried. The film structure is then asembled as shown in FIGURE 2 with a photoconductive layer 1 of amorphous selenium, approximately 1 mil thick on an aluminum plate 4. The film structure is transparent in the visible range and is sensitive in the ultraviolet and the amorphous selenium layer is sensitive in the visible. Exposure is carried out while a voltage of 600 to 1000 volts is applied to electrodes 4 and 5, using a 100 watt mercury lamp for a period of about one second. An image is obtained which is darkened because of the presence of the silver products of decomposition.

While the invention has been particularly shown and described with reference to preferred embodiments thereof, it will be understood by those skilled in the art that various changes in form and details may be made therein without departing from the spirit and scope of the invention.

I claim:
1. An electrophotographic element generally unaffected by ordinary room light adapted to form an image by selective decomposition under the influence of simultaneous application of an electric field and imagewise illumination in the ultraviolet electromagnetic radiation range up to about 5900 Angstroms in said range comprising a photoconductive layer capable of forming a latent conduction image, corresponding to an optical image, and adjacent thereto and in contact therewith a photo-reactive and electro-reactive layer containing a material which is decomposable by dielectric breakdown under the action of said electrical field applied through said conduction image to said electro-reactive layer, said decomposable material being selected from the group consisting of:
   (a) potassium azide, cadmium oxalate, gallium oxalate, lead oxalate, lithium iodate, silver iodate, magnesium perchlorate, sodium nitrate, sodium acetylide, zinc amide;
   (b) silver azide, silver acetylide, silver oxalate, mercuric azide, silver fulminate;
   (c) benzene diazonium nitrate, benzene diazonium perchlorate, p-diazodiphenyl amino perchlorate, triphenyl methyl azide, tri-p-anisyl methyl perchlorate, 2-amino-1-naphthol-t-sulfonic acid, 4-diethyl-aminobenzene diazonium chloride, 4-diethylaminobenzene diazonium chloride zinc chloride double salt, paradiazo dimethyl aniline zinc chloride, p-(hydroxyethylethyl amino) benzene diazonium chloride, diphenyl amine diazonium sulfate;
and mixtures of (a), (b) and (c), and said simultaneous application of electric field and illumination producing reaction products which are made visible in said electro-reactive layer due to said dielectric breakdown at said imagewise exposure of the element to said electromagnetic radiation.

2. An electrophotographic element generally unaffected by ordinary room light adapted to form an image by selective decomposition under the influence of simultaneous application of an electric field and imagewise illumination in the ultraviolet electromagnetic radiation range up to about 5900 Angstroms in said range comprising a photoconductive layer capable of forming a latent conduction image corresponding to an optical image, and adjacent thereto and in contact therewith, a photoelectro-reactive layer containing a material selected from the group consisting of heavy metal azide, heavy metal acetylide, heavy metal fulminate and heavy metal perchlorate which is decomposable by dielectric breakdown under the combined action of the radiant energy which is absorbed in said material and of said electrical field applied through said conduction image to said photoelectro-reactive layer, and said simultaneous application of electric field and illumination producing decomposition products which are made visible in said photoelectro-reactive layer due to said dielectric breakdown at said imagewise exposure of the element to said electromagnetic radiation.

3. An element as claimed in claim 1 wherein said reactive layers include an opaque backing.

4. An element as claimed in claim 1 wherein said photoconductive layer is formed of selenium.

5. An element as claimed in claim 1 wherein said electro-reactive material is a water-soluble ionic azide.

6. An element as claimed in claim 1 wherein said reactive material is provided in the form of a coating in a binder on a transparent base.

7. An element as claimed in claim 1 wherein said reactive material is provided in the form of an intermediate sandwich layer between two sheets of transparent material.

8. A one-step process of electrophotography comprising assembling a photoconductive layer capable of forming a latent conduction image, corresponding to an optical image, adjacent to and in contact with a photo-reactive and electro-reactive layer containing a material which is decomposable under the action of electrical stress applied to said electro-reactive layer, said decomposable material being selected from the group consisting of:
   (a) potassium azide, cadmium oxalate, gallium oxalate, lead oxalate, lithium iodate, silver iodate, magnesium perchlorate, sodium nitrate, sodium acetylide, zinc amide;
   (b) silver azide, silver acetylide, silver oxalate, mercuric azide, silver fulminate;
   (c) benzene diazonium nitrate, benzene diazonium perchlorate, p-diazodiphenyl amino perchlorate, triphenyl methyl azide, tri-p-anisyl methyl perchlorate, 2-amino-1-naphthol-t-sulfonic acid, 4-diethyl-aminobenzene diazonium chloride, 4-diethylaminobenzene diazonium chloride zinc chloride double salt, paradiazo dimethyl aniline zinc chloride, p-(hydroxyethylethyl amino) benzene diazonium chloride, diphenyl amine diazonium sulfate;
and mixtures of (a), (b) and (c), and exposing said photoconductive layer to an image pattern in the ultraviolet of electromagnetic radiation range up to about 5900 Angstroms in said range while subjecting the assembly to the influence of an electric field, thereby producing image-forming products of decomposition by dielectric breakdown, said product being localized in said electro-reactive layer.

9. A one-step process of electrophotography comprising assembling a photoconductive layer capable of forming a latent conduction image corresponding to an optical image adjacent to and in contact with a photoelectro-reactive layer containing a material selected from the group consisting of heavy metal azide, heavy metal acetylide, heavy metal fulminate and heavy metal perchlorate which is decomposable under the combined action of radiant energy absorbed in said material and electrical stress applied to said photoelectro-reactive layer and exposing said photoconductive layer and said photoelectro-reactive layer to an image pattern of electromagnetic radiation while subjecting the assembly to the influence of an electric field, thereby producing image-forming products of decomposition localized in said photoelectro-reactive layer.

10. A process as claimed in claim 9 wherein said photoconductive layer is transparent and exposure is directed through said transparent layer to reach the photoelectro-reactive layer.

11. A process as claimed in claim 9 wherein said photoelectro-reactive layer is transparent and exposure is directed through said transparent layer to reach the photoconductive layer.

References Cited by the Examiner

UNITED STATES PATENTS

| | | | |
|---|---|---|---|
| 2,425,742 | 8/1947 | Kline | 204—2 |
| 2,541,488 | 2/1951 | Vanselow et al. | 204—2 |
| 2,606,807 | 8/1952 | Pessel | 204—2 |
| 2,703,283 | 3/1955 | Eggert | 96—88 X |
| 2,798,960 | 7/1957 | Moncrieff-Yeates | 96—1 |
| 3,088,883 | 5/1963 | Robillard | 96—1 |
| 3,106,155 | 10/1963 | Eastman et al. | 96—1 |
| 3,148,276 | 9/1964 | Rothstein | 96—1 |

FOREIGN PATENTS

| | | |
|---|---|---|
| 1,312,209 | 11/1962 | France. |
| 188,030 | 10/1922 | Great Britain. |

OTHER REFERENCES

Benbrook, "The Diazotype Process," American Documentation, vol. 8, April 1957, pp. 81–88.

Zwikker, "Fluorescent Lighting," 1952, Elsevier Press, Houston, Tex.; pp. 92–93 relied on.

NORMAN G. TORCHIN, *Primary Examiner.*

J. TRAVIS BROWN, *Examiner.*

A. LIBERMAN, C. E. VANHORN, *Assistant Examiners.*